United States Patent [19]

Hsiung

[11] Patent Number: 5,690,418
[45] Date of Patent: Nov. 25, 1997

[54] MULTIPURPOSE LASER POINTER

[76] Inventor: Bear Hsiung, 5F, No. 30, Lane 179, Sec. 2, Nei-Hu Rd., Taipei, Taiwan

[21] Appl. No.: 689,720

[22] Filed: Aug. 16, 1996

[51] Int. Cl.$^6$ ................................................ F21L 15/08
[52] U.S. Cl. ...................... 362/259; 362/190; 362/194; 362/388; 362/414
[58] Field of Search .............................. 33/281, 282, 283, 33/285, 286, 451, DIG. 21; 362/157, 190, 191, 194, 196, 199, 259, 388, 410, 413, 414

[56] References Cited

U.S. PATENT DOCUMENTS

| | | | |
|---|---|---|---|
| 2,237,536 | 4/1941 | Wells, Jr. | 362/190 |
| 3,775,929 | 12/1973 | Roodvoets et al. | 33/286 |
| 3,909,952 | 10/1975 | Lagasse | 33/286 |
| 3,911,588 | 10/1975 | Ohneda | 33/286 |
| 5,012,585 | 5/1991 | DiMaggio | 33/286 |
| 5,163,229 | 11/1992 | Cantone | 33/283 |
| 5,319,365 | 6/1994 | Hillinger | 362/191 |
| 5,537,205 | 7/1996 | Costa et al. | 33/286 |

FOREIGN PATENT DOCUMENTS 679425  2/1992  Switzerland ............. 33/DIG. 21

*Primary Examiner*—Alan Cariaso
*Attorney, Agent, or Firm*—David I. Klein; Morton J. Rosenberg

[57] ABSTRACT

A laser pointer including a hexagonal laser module case holding a laser module for projecting a laser beam, a hexagonal battery case longitudinally spaced from and connected to the laser module case by connecting plates and having a point at the bottom for aiming at a reference point on the ground during a correction of vertical alignment, a rack having a center block with a conical top tip supported between the laser module case and the battery case, and three equiangularly spaced legs respectively pivoted to the rack outside the battery case, the legs having a respective longitudinal outer plane, which is disposed in parallel with the laser beam of the laser module when the legs are collapsed, and a level mounted on the longitudinal outer plane of one leg for determining, or adjusting the longitudinal outer plane of the respective leg on, an even horizontal plane.

1 Claim, 7 Drawing Sheets

MULTIPURPOSE LASER POINTER

BACKGROUND OF THE INVENTION

The present invention relates to laser pointer, and relates more particularly to such a laser pointer which can be used for pointing things out on a map, blackboard, etc., as well as for correcting vertical alignment and horizontal alignment.

During a construction work, a weight is commonly used and suspended from a wire for correcting vertical alignment. A weight for this purpose is made having an invertedly disposed conical body. When suspended from a wire, the weight is attracted by the gravitation of the earth, causing the wire to be maintained in vertical. However, this instrument cannot be used for adjusting a surface on an even horizontal plane. For determining, or adjusting a surface on, an even horizontal plane, a level shall be used. However, a level can only be placed on a surface during the operation. When a level is placed on a circular surface for example the surface of a water pipe, it cannot be maintained in balance.

SUMMARY OF THE INVENTION

The present invention provides a laser pointer which can be used for pointing things out on a map, blackboard, etc., as well as for correcting vertical alignment and horizontal alignment. A laser pointer in accordance with the preferred embodiment of the present invention comprises: a laser module case shaped like a hexagonal prism, having a top side, a bottom side, and a laser beam outlet at the center of the top side; an on/off switch mounted on the laser module case on the outside; a laser module mounted inside the laser module case, having a laser firing hole disposed in alignment with the laser beam outlet of the laser module case, and controlled by the on/off switch to project a laser beam out of the laser firing hole and the laser beam outlet; a battery case shaped like a hexagonal prism longitudinally spaced from and connected to the laser module case by connecting plates, the battery case comprising a battery set on the inside electrically connected to the laser module through the switch, a closed top side, a threaded bottom opening, a screw cap threaded into the threaded bottom opening, and a point downwardly vertically raised from the screw cap; a rack a center supported between the bottom side of the laser module case and the top side of the battery case, the rack having a center block supported on the top side of the battery case at the center, a conical tip raised from the center block on which the bottom side of the laser module case is supported, and three equiangularly spaced supporting rods radially raised from the center block and projecting over the periphery of the laser module case and the battery case; three legs respectively pivoted to the supporting rods of the rack outside the laser module case and the battery case, each of the legs having a longitudinal outer plane and a longitudinal inner plane, the longitudinal outer planes of the legs being disposed in parallel to the laser beam of the laser module when the longitudinal planes thereof are closely attached to the periphery of the battery case; and a level mounted on one of the legs in parallel to the corresponding longitudinal outer plane for determining, or adjusting a surface to, an even horizontal plane.

DETAILED DESCRIPTION OF THE PREFERRED EMBODIMENT

Figure 1:
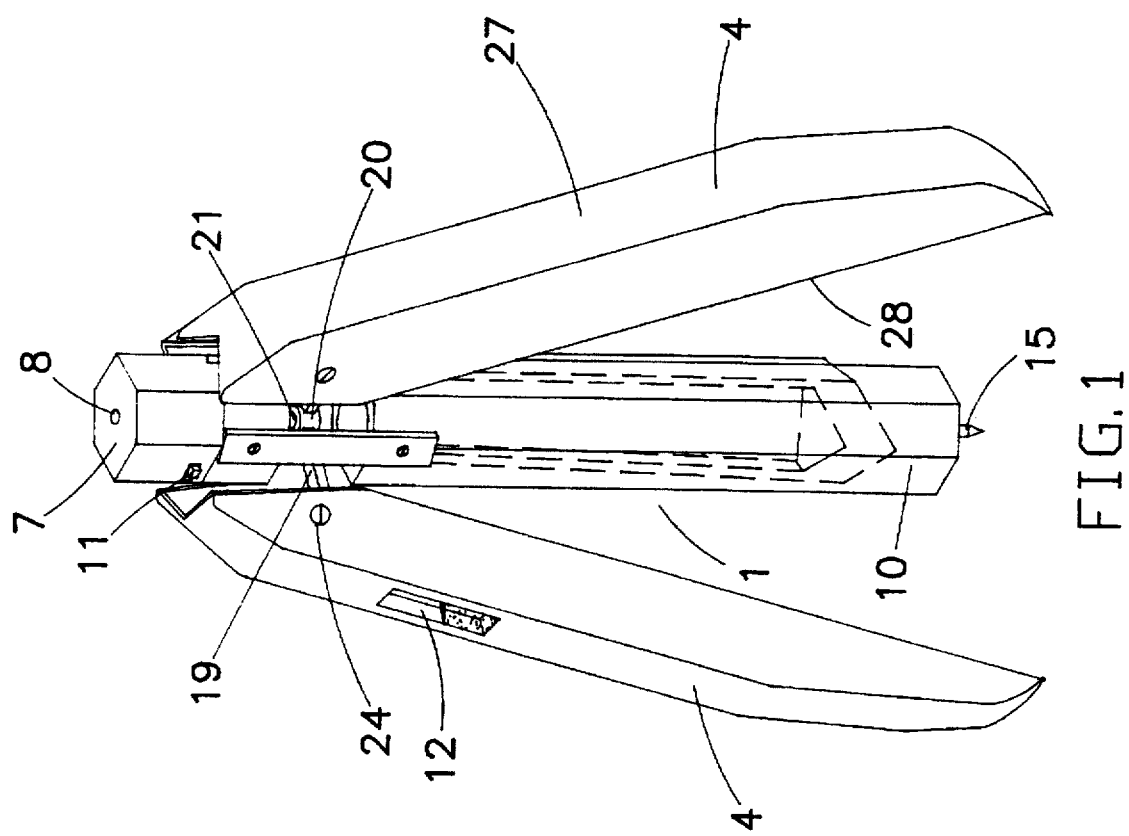
FIG. 1 is a perspective view of the present invention, showing the legs extended out.
Figure 2:
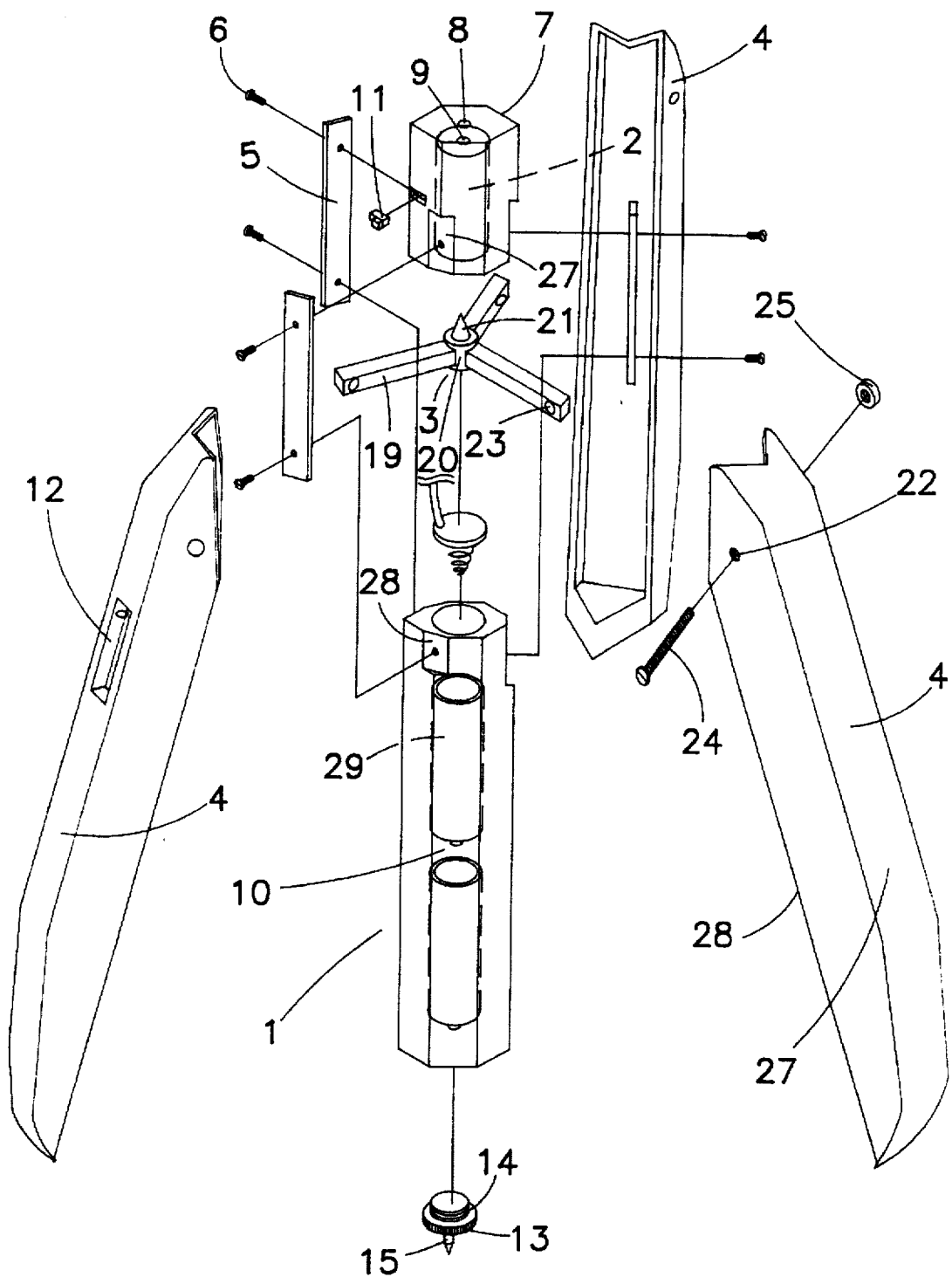
FIG. 2 is an exploded view of the laser pointer shown in FIG. 1.
Figure 3:
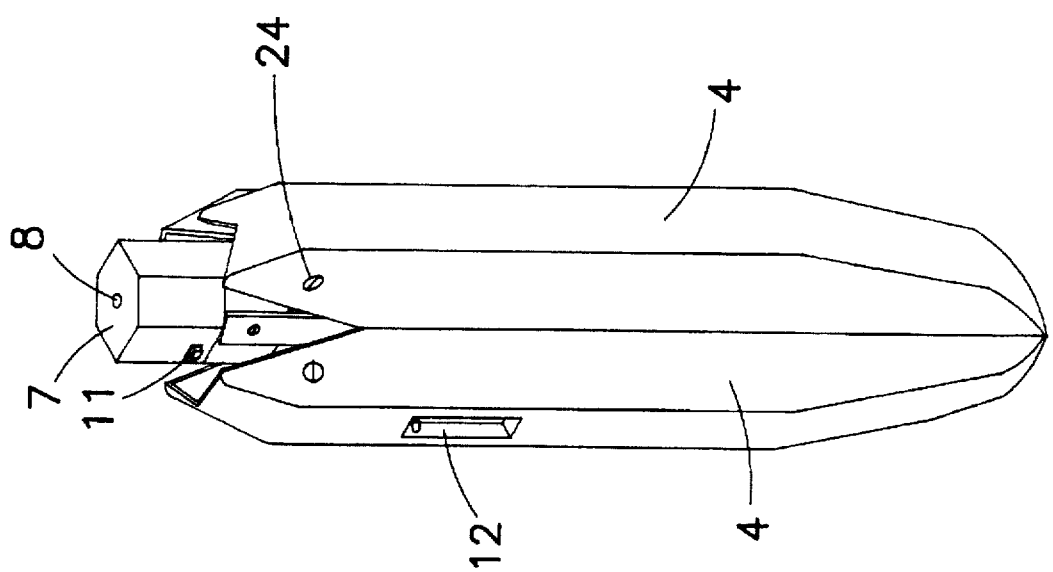
FIG. 3 is an elevational view of the present invention, showing the legs collapsed.

Referring to FIGS. 1, 2, and 3, a multipurpose laser pointer in accordance with the present invention is generally comprised of a housing 1, a laser module 2, a rack 3, and a plurality of legs 4.

The housing 1 is comprised of a battery case 10 and a laser module case 7 longitudinally connected together. The battery case 10 and the laser module case 7 are respectively shaped like a hexagonal prism. The laser module case 7 holds the laser module 2 on the inside, having three planes 27 equiangularly spaced around the periphery and respectively extending to the bottom side, and a laser beam outlet 8 at the center of the top side thereof. The laser module 2 is mounted inside the laser module case 7, having a laser firing hole 9 disposed in alignment with the laser beam outlet 8 of the laser module case 7. The battery case 10 holds a battery set 29 on the inside, having three planes 28 equiangularly spaced around the periphery and respectively extending to the top side in alignment with the planes 27 of the laser module case 7. Two connecting plates 5 are respectively connected between two planes 27 of the laser module case 7 and two corresponding planes 28 of the battery case 10, and fixedly secured in place by screws 6. A switch 11 is mounted on the laser module case 7 on the outside, and adapted for controlling the operation of the laser module 2. A screw cap 13 is provided having an outer thread 14 at the top threaded into an inner thread (not shown) at the bottom of the battery case 10, and a point 15 at the bottom for positioning. When the screw cap 13 is removed from the battery case 10, the bottom side of the battery case 10 is opened, for permitting the battery set 29 to be taken out for a replacement. The rack 3 is movably mounted between the battery case 10 and the laser module case 7, comprising a center block 20, three equiangularly spaced supporting rods 19 radially raised from the periphery of the center block 20 and extending out of the housing 1 for coupling to the legs 4 respectively, and an upright conical tip 21 raised from the center block 20 at the top. Each of the supporting rods 19 has a pivot hole 23 near the outer end. Each of the legs 4 has a substantially U-shaped cross section, a pivot hole 22 near the top pivotably coupled to the pivot hole 23 of one supporting rod 19 by one screw 24 and one nut 25, a longitudinal outer plane 27 and a longitudinal inner plane 28 disposed in parallel. When assembled, the legs 4 can be respectively turned about the supporting rods 19 of the rack 3 between the collapsed position and the extended position. When the legs 4 are collapsed, the longitudinal inner planes 28 are closely attached to the periphery of the housing 10, and the longitudinal outer planes 27 are disposed in parallel to the laser beam of the laser module 2. Further, a level 12 is mounted on one leg 4 on the outside. When the laser pointer is assembled, the laser module case 7 is balanced on the conical tip 21 of the center block 20 of the rack 3. When the legs 4 are extended out, the weight of the laser module case 7, the laser module 2, the battery case 10, and the battery set 29 are supported on the conical tip 21 of the center block 20 of the rack 3. Because the battery set 29 is heavier than the combined weight of the laser module case 7 and the laser module 2, the center of gravity of the laser pointer is allocated at the lower part of the housing 1, causing the battery case 10 to act as a pendulum.

Figure 4:
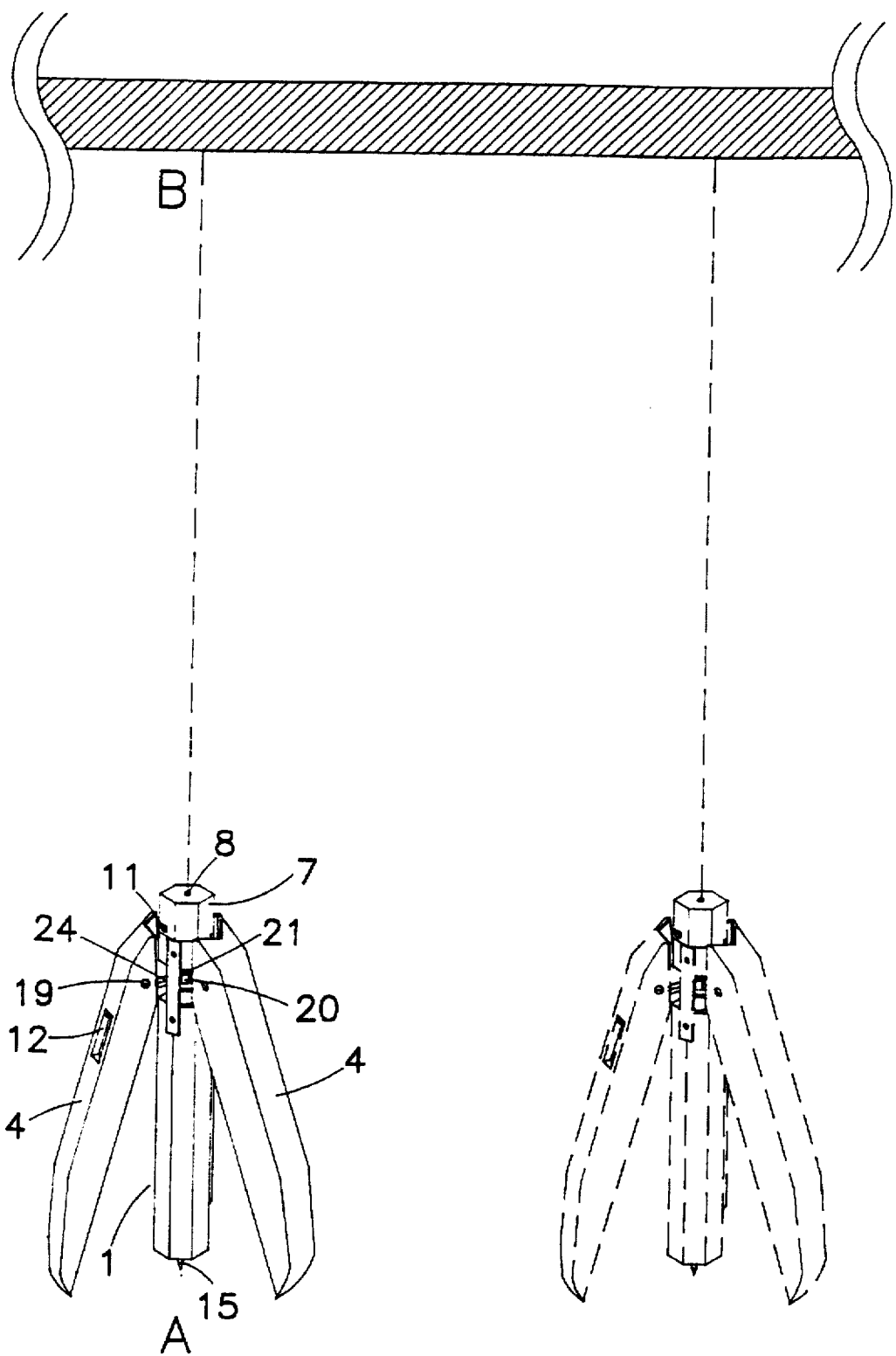
FIG. 4 is an applied view of the present invention in the correction of vertical alignment.

Referring to FIG. 4, when the laser pointer is used for vertical alignment, the point 15 of the screw cap 13 is aimed at a reference point A on the ground, then the laser module 2 is turned on to project a laser beam onto the target so as to obtain a projecting point B. When the projecting point B is in alignment with the reference point A, the vertical alignment is achieved.

When the legs 4 of the laser pointer are collapsed and closely attached to the housing 1 as shown in FIG. 3, the longitudinal outer plane 27 of one leg 4 is placed on an even horizontal plane for horizontal calibration through the level 12.

Figure 5:
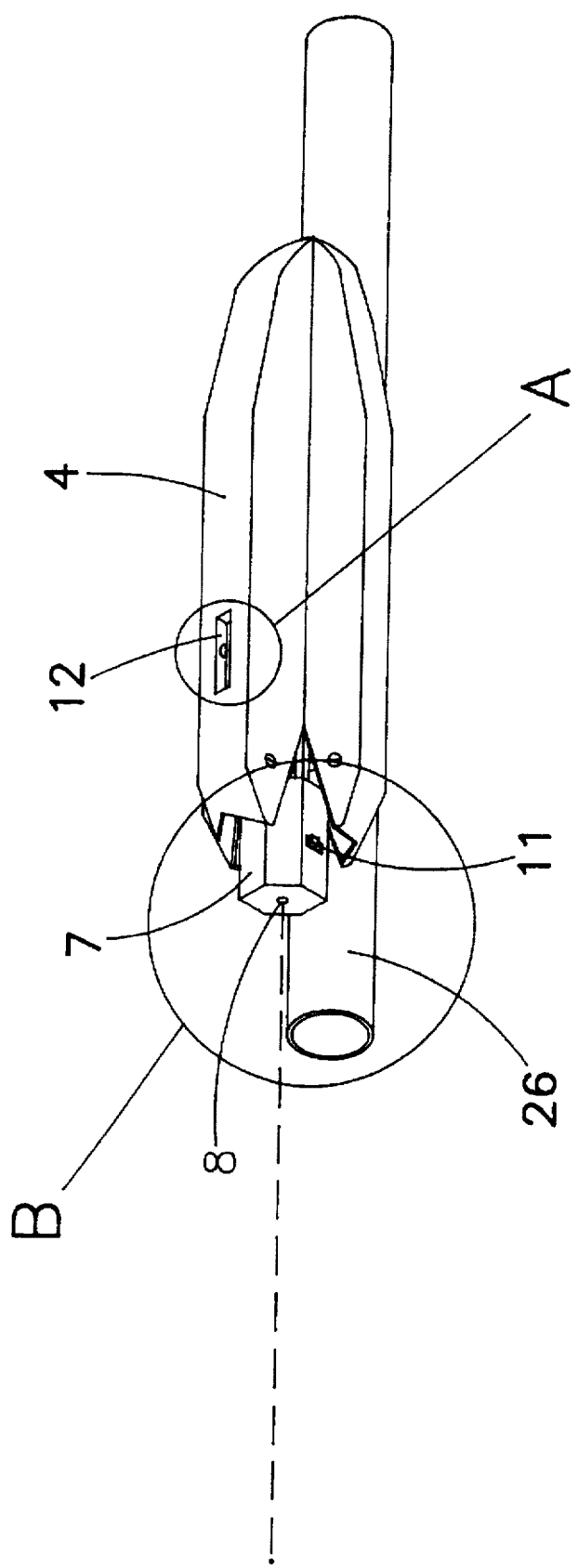
FIG. 5 is an applied view of the present invention in the correction of the horizontal alignment of a water pipe.
Figure 5A:
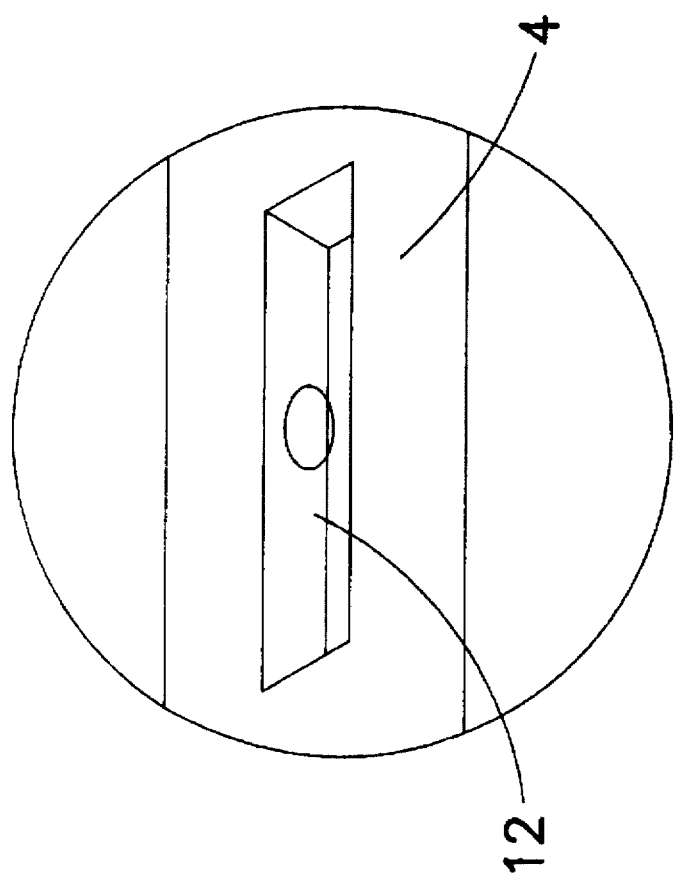
FIG. 5A is an enlarged view of part A of FIG. 5.
Figure 5B:
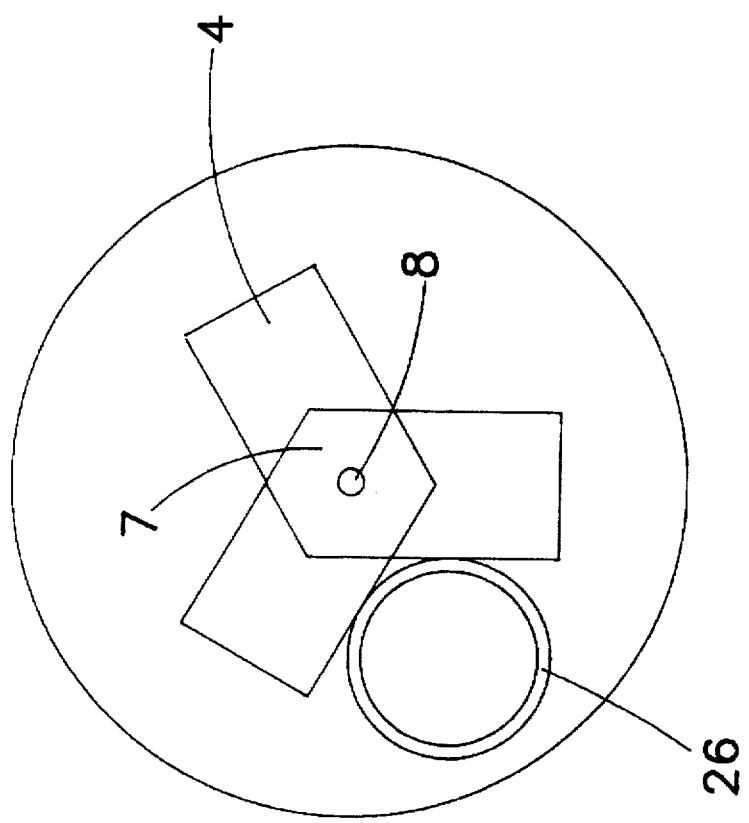
FIG. 5B is an enlarged view of part B of FIG. 5.

Referring to FIG. 5, through the legs 4, the laser pointer can be supported on the outer diameter of a cylindrical object for example a water pipe 26, for adjusting the surface of the water pipe 26 to an even horizontal plane.

While only one embodiment of the present invention has been shown and described, it will be understood that various modifications and changes could be made without departing from the spirit and scope of the invention disclosed.

What the invention claimed is:

1. A laser pointer comprising:

a laser module case shaped as a hexagonal prism, having a top side, a bottom side, and a laser beam outlet at the center of the top side;

an on/off switch mounted on said laser module case on the outside;

a laser module mounted inside said laser module case, having a laser firing hole disposed in alignment with the laser beam outlet of said laser module case, and controlled by said on/off switch to project a laser beam out of said laser firing hole and said laser beam outlet;

a battery case shaped as a hexagonal prism longitudinally spaced from and connected to said laser module case by connecting plates, said battery case comprising a battery set on the inside electrically connected to said laser module through said switch, a closed top side, a threaded bottom opening, a screw cap threaded into said threaded bottom opening, and a point downwardly vertically raised from said screw cap;

a rack having a center supported between the bottom side of said laser module case and the top side of said battery case, said rack having a center block supported on the top side of said battery case at the center, a conical tip raised from said center block on which the bottom side of said laser module case is supported, and three equiangularly spaced supporting rods radially raised from said center block and projecting over the periphery of said laser module case and said battery case;

three legs respectively pivoted to the supporting rods of said rack outside said laser module case and said battery case, each of said legs having a longitudinal outer plane and a longitudinal inner plane, the longitudinal outer planes of said legs being disposed in parallel to the laser beam of said laser module when the longitudinal planes thereof are closely attached to the periphery of said battery case; and a level mounted on one of said legs in parallel to the corresponding longitudinal outer plane for determining, or adjusting a surface to, an even horizontal plane.

* * * * *